(12) United States Patent
Aldohin et al.

(10) Patent No.: US 8,714,600 B2
(45) Date of Patent: May 6, 2014

(54) HIGHLY-TIGHT THREADED JOINT

(76) Inventors: Vladimir Petrovich Aldohin, Taganrog Rostovskaya (RU); Aleksej Viktorovich Emel'Janov, Moscow (RU); Jurij Fjodorovich Emel'Janov, Taganrog Rostovskaya obl. (RU); Aleksandr Vladimirovich Zaslavskij, Kamensk-Uralsky Sverdlovskaya obl. (RU); Mihail Noehovich Lefler, Kamensk-Uralsky Sverdlovskaya obl. (RU); Pavel Nikolaevich Sidorenko, Taganrog Rostovskaya obl. (RU); Boris Jur'evich Shherbakov, Taganrog Rostovskaya obl. (RU)

( * ) Notice: Subject to any disclaimer, the term of this patent is extended or adjusted under 35 U.S.C. 154(b) by 218 days.

(21) Appl. No.: 12/841,654

(22) Filed: Jul. 22, 2010

(65) Prior Publication Data

US 2011/0012348 A1 Jan. 20, 2011

(51) Int. Cl.
*F16L 35/00* (2006.01)

(52) U.S. Cl.
USPC .......................................... 285/334; 285/333

(58) Field of Classification Search
USPC ................................. 285/333, 334
See application file for complete search history.

(56) References Cited

U.S. PATENT DOCUMENTS

| | | | | |
|---|---|---|---|---|
| 3,359,013 A | * | 12/1967 | Knox et al. | 285/334 |
| 4,494,777 A | * | 1/1985 | Duret | 285/334 |
| 4,550,937 A | * | 11/1985 | Duret | 285/334 |
| 5,137,310 A | * | 8/1992 | Noel et al. | 285/333 |
| 5,649,725 A | * | 7/1997 | Nagasaku et al. | 285/334 |
| 5,906,399 A | * | 5/1999 | Noel | 285/333 |
| 6,478,344 B2 | * | 11/2002 | Pallini et al. | 285/333 |
| 6,789,823 B2 | * | 9/2004 | Sches et al. | 285/333 |
| 6,851,727 B2 | * | 2/2005 | Carcagno et al. | 285/333 |
| 6,905,150 B2 | * | 6/2005 | Carcagno et al. | 285/334 |
| 6,921,110 B2 | * | 7/2005 | Morotti et al. | 285/333 |
| 7,255,374 B2 | * | 8/2007 | Carcagno et al. | 285/333 |
| 7,334,821 B2 | * | 2/2008 | Dutilleul et al. | 285/333 |
| 7,494,159 B2 | * | 2/2009 | Sugino et al. | 285/334 |
| 8,070,191 B2 | * | 12/2011 | Fujii | 285/333 |

* cited by examiner

*Primary Examiner* — David E Bochna

(57) ABSTRACT

A highly-tight screw joint comprising internal and external mating elements with conical surfaces used in connection with oil and gas wells. The internal and external elements are provided with a thread with supporting and embedded faces. A sealing unit is made in the form of a wedge on the side of a small diameter. The sealing unit is provided on the internal and external elements and consists of parts of the internal and external elements. The internal and external elements are formed by conical radial and conical supporting faces. The conical radial face is made at an angle of 25°-35° to the normal to the thread axis. The conical supporting surface is made at the angle of 10°-25° to the normal to thread axis.

5 Claims, 3 Drawing Sheets

HIGHLY-TIGHT THREADED JOINT

CROSS-REFERENCE TO RELATED APPLICATION

Figure 1:
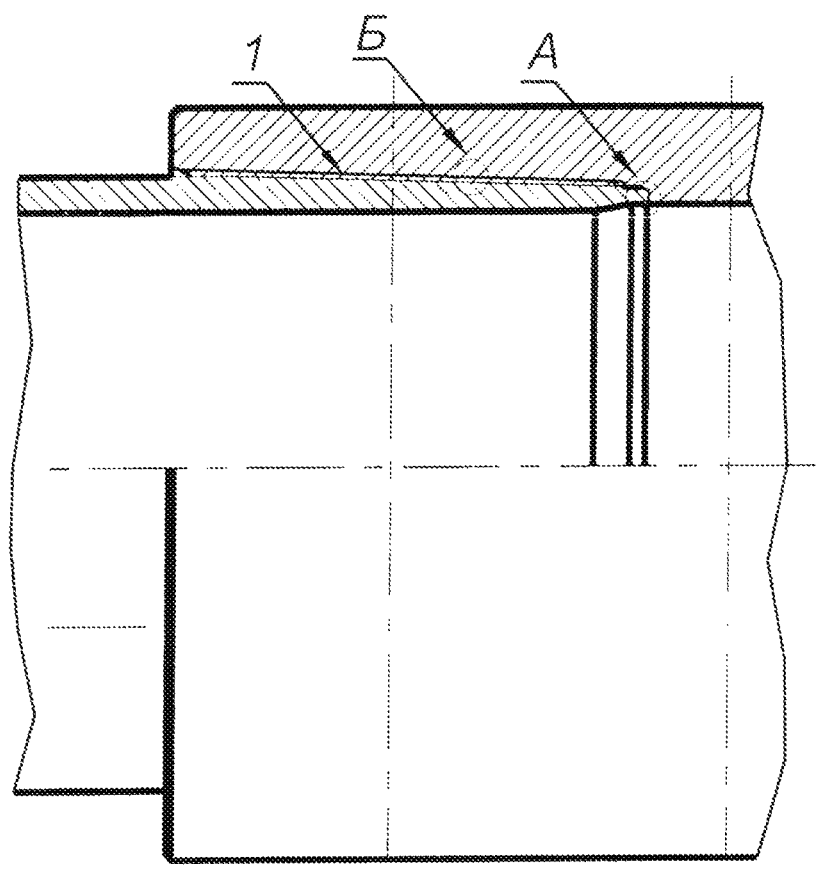

This application claims the benefit of the priority filing date in PCT/RU2008/000237 referenced in WIPO Publication WO/2009/093929. The earliest priority date claimed is Jan. 25, 2008.

FEDERALLY SPONSORED RESEARCH

None

SEQUENCE LISTING OR PROGRAM

None

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The invention pertains to the field of construction, in particular, of building oil and gas wells, and can be used for casing stings and tubings. A threaded joint for casing strings and tubings is highly-tight and is designed for use in wells characterized by high rates of shaft crookedness and/or severe operating conditions, such as high tension or compression loads, excessive internal and external pressures, and environments with high concentrations of $H_2S$ and $CO_2$.

Known is a technical solution protected by patent FR 1489013, priority Nov. 5, 1965, describing a highly-tight threaded joint. In the known technical solution, the threaded joint has internal and external interfacing elements with tapered surfaces. The tapered surfaces of the elements have threads with a bearing face and an inserted face. On the side of the thread taper's smaller diameter, there is a sealing component made in the shape of a wedge and comprising parts of the internal element and external element.

However, a shortcoming of this threaded joint is that the sealing component is not sufficiently tight. In addition, such a design makes it impossible to achieve the desired interference at low axial movements of the internal element, which lengthens the time between the first contact of the sealing surfaces and achievement of the required interference. In addition, under severe operating conditions (high tension or compression loads, excessive internal and external pressures) there are flexural deformations that disrupt the contact of taper surfaces which results in unsealing the threaded joint.

This technical solution is used as the closest analogue of the claimed technical solution.

In developing the invention, the objective was to design a highly-tight threaded joint that would make it possible to reassemble the threaded joint without damaging it, ensuring extreme tightness, improving the behavior of the threaded joint in tension and bending, achieving a guaranteed contact along the straight section of the thread bearing surface when screwing and unscrewing the joint, and increasing resistance to compression loads.

The achieved technical is increased reliability and tightness of the joint, increased joint strength, simplified assembly-disassembly during operation, and increased wear resistance and life of the joint.

This technical result is achieved due to the fact that a highly-tight threaded joint has internal and external interfacing elements with tapered surfaces that have threads with bearing and inserted faces, and on the side of the thread taper's smaller diameter, there is a sealing component made in the shape of a wedge and comprising parts of internal and external elements. The sealing component's internal and external parts are formed by a tapered radial surface and a tapered bearing surface, wherein the tapered radial surface is at a 25°-35° angle to the normal to the thread axis, and the tapered bearing surface is at a 10°-25° angle to the normal to the thread axis.

The table vividly demonstrates the effect of the angles on the threaded joint's tightness, reliability and life. The table's second column shows the pressure a pipe and joints must withstand while maintaining tightness. The third and fourth columns show stress readings taken when testing the joint; in the process, the joint itself had remained tight.

| Angle Combination | Hydrotesting Pressure, MPa | Average Contact Stresses in the Radial Seal After Assembly, MPa | Average Contact Stresses in the Radial Seal After Tension (0.8σт), MPa |
|---|---|---|---|
| 25°-10° | 64.5 | 793.7 | 690.2 |
| 30°-15° |  | 1054.9 | 794.3 |
| 35°-25° |  | 1158.5 | 865.1 |

These features are essential and interrelated, forming a stable set of essential features that is sufficient to achieve the stated technical result.

In the sealing component, contact between the radial seal of the part of the internal element in the shape of a cone, and the mating tapered surface of the part of an external element, takes place with interference over a relatively small area. As a result, high contact stresses occur which ensures high tightness. The rapid achievement of the desired radial interference during the assembly process results in a design that makes it possible to reassemble the threaded joint without damaging the sealing surface. In addition, such design of the sealing component makes it possible for the threaded joint to stay tight when exposed to substantial flexural loads. As a result, the bearing surfaces protect the radial seal from excessive torque and compression.

To enhance the technical result, one can use a series of the following features.

In the highly-tight threaded joint, thread with a 1:16 taper is used.

The thread bearing face is at a 1°-5° angle to the normal to the thread axis, and the inserted face is at a 7°-25° angle. This angle of the thread bearing face ensures improved operation of the threaded joint in tension and bending, and the angle of the inserted face improves conditions for joint assembly when engaging the first several turns of the thread.

Along the bearing face's straight section, the internal and external parts have different thread radii. Such design makes it possible to improve the threading of the joint together, and increase its resistance to wear and compression loads.

SUMMARY

The invention relates to building oil and gas wells and can be used in casing strings and tubings. The inventive highly-tight screw joint comprises internal and external mating elements with conical surfaces. The internal and external elements are provided with a thread. Said thread has supporting and embedded faces. A sealing unit is made in the form of a wedge on the side of a small diameter. The sealing unit is provided on the internal and external elements. The sealing unit consists of the parts of the internal and external elements. The internal and external elements of the sealing unit are formed by conical radial and conical stop faces. The conical radial face is made at an angle of 25°-35° to the normal to the thread axis. The conical supporting surface is made at the angle of 10°-25° to the normal to thread axis. Said invention makes it possible to increase the reliability, the tightness and the strength of the joint, to ease the assembly and disassembly thereof, to improve the abrasion resistance of the joint, and to extend the service life thereof.

FIGURES

Figure 2:
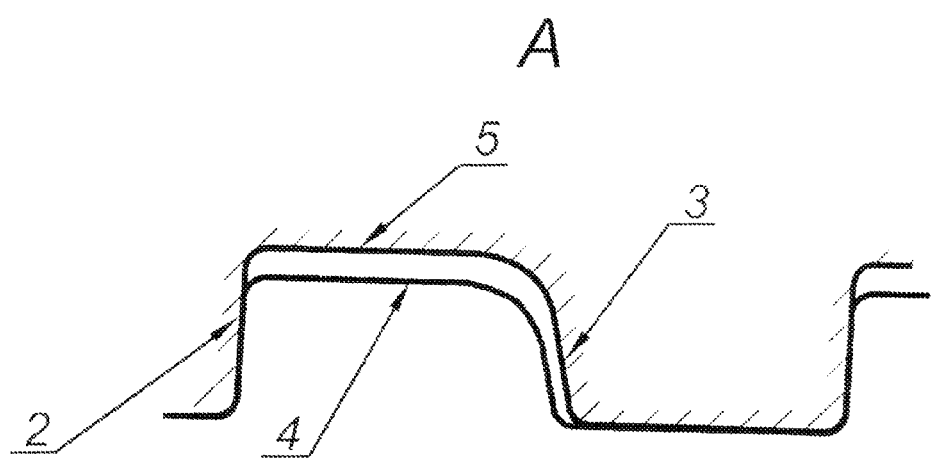
Figure 3:
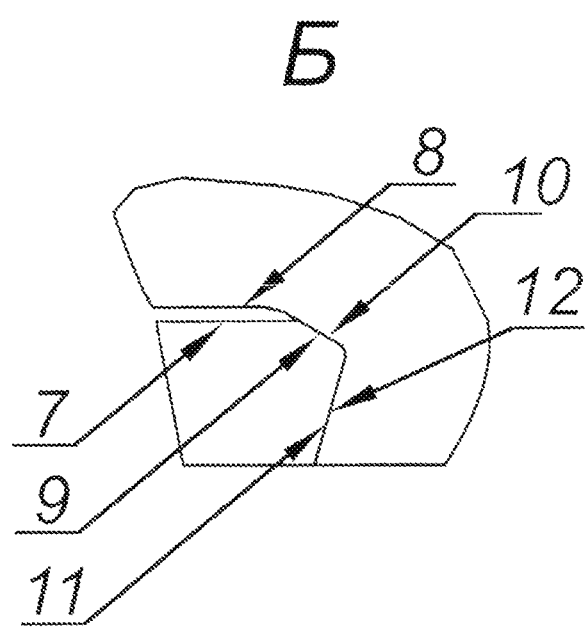

FIG. 1 shows a highly-tight threaded joint of casings with the internal and external elements.
FIG. 2 shows the thread profile.
FIG. 3 shows the sealing component.

REFERENCE NUMERALS (1) thread
(2) supporting face
(3) embedded face
(4) thread profile of the internal element
(5) thread profile of the external element
(6) sealing unit
(7) internal element of sealing unit
(8) external element of sealing unit
(9) and (10) conical radial surfaces
(11) and (12) conical supporting surfaces

DESCRIPTION

In the highly-tight threaded joint, a thread (1) with a 1:16 taper is used. The thread profile has a positive angle of 1°-5° along the supporting face (2) and 7°-25° along the embedded face (3). The height of the thread profile of the internal element (4) is lower than the height of the thread profile of the external element (5). A sealing unit (6) is made in the form of a wedge on the side of the small diameter. The sealing unit is provided on the internal (7) and external elements (8). The sealing unit consists of the parts of the internal element (7) and external element (8). Parts of the internal and external elements are formed by conical radial surfaces (9) and (10) and conical supporting surfaces (11) and (12). The conical radial face is made at a 25°-35° angle to the normal to the thread axis, and the conical supporting face is made at a 10°-25° angle to the normal to the thread axis.

The invention is explained using a specific example. It clearly demonstrates the possibility of achieving the above technical result. However, this is not the only possible example.

In the highly-tight threaded joint, a thread with a 1:16 taper is used. The thread profile has a positive angle of 3° along the supporting face and 10° along the embedded face. The height of the thread profile of the internal element is lower than the height of the thread profile of the external element. The sealing unit is made in the form of a wedge on the side of the small diameter, is provided on the internal and external elements, and comprises the parts of the internal element and external elements. Parts of the internal and external elements are formed by conical radial and conical supporting surfaces. The conical radial face is made at a 30° angle to the normal to the thread axis, and the conical supporting face is made at a 15° angle to the normal to the thread axis.

The highly-tight threaded joint works as follows.

When performing operations of screwing and unscrewing the threaded joint, the interaction of internal (4) and external (5) elements by means of the thread (1) occurs first. When screwing the joint, the surface of the internal element moves along the surface of the external element. Then, the conical radial face (9) and conical supporting face (11) of the internal element interact with the conical radial surface (10) and conical supporting surface (12) of the external element. Due to diametrical deformations of these surfaces, a "metal-to-metal" type sealing component is created.

When elements (4) and (5) move relative to each other, a forced contact of supporting surfaces (11) and (12) of the internal element and the external element occurs. As a result, contact stresses develop on their surfaces. The magnitude of the stresses must be within the limits of elastic strains. All other conditions being equal, the level of contact stresses is determined by the size of the contact areas of surfaces (9), (10), (11), (12).

The advantage of the claimed threaded joint compared to the known one is improved reliability of tightness, increased joint strength, facilitation of assembling-disassembling during operation, and increased wear resistance and life of the joint.

The invention is new and commercially practicable because, by using known processes used for making threaded pipe ends, it can be put into practice based on a new principle of interaction of mating surfaces that is different from known designs.

The invention claimed is as follows:

1. A highly threaded screw joint having internal and external mating elements, comprising:
   a thread having a 1:16 taper;
   the thread having a profile with a positive angle of 1 degree along a supporting face and 7 degrees along an embedded face;
   a sealing unit comprising parts of the internal and external mating elements, distinct in that the internal and external parts of the sealing unit are formed by conical radial and conical supporting faces, wherein the conical radial face is made at a substantially 35 degree angle to the normal to the thread axis, and the conical supporting face is made at a substantially 10 degree angle to the normal thread axis.

2. A highly threaded screw joint having internal and external mating elements, comprising:
   a thread having a 1:16 taper;
   the thread having a profile with a positive angle of between 1 and 5 degrees along a supporting face and 7 and 25 degrees along an embedded face;
   a sealing unit comprising parts of the internal and external mating elements, distinct in that the internal and external parts of the sealing unit are formed by conical radial and conical supporting faces, wherein the conical radial face is made at a substantially 35 degree angle to the normal to the thread axis, and the conical supporting face is made at a substantially 10 degree angle to the normal thread axis.

3. The thread screw joint of claim 2, wherein, along a straight section of the supporting face, the internal and external mating elements have different thread radii.

4. A highly threaded screw joint having internal and external mating elements, comprising:

a thread having a 1:6 taper;

the thread having a profile with a positive angle between 1 and 50 degrees along a supporting face and between 7 and 25 degrees along an embedded face;

a sealing unit comprising parts of the internal and external mating elements, distinct in that the internal and external parts of the sealing unit are formed by conical radial and conical supporting faces, wherein the conical radial face is made at a substantially 35 degree angle to the normal to the thread axis, and the conical supporting face is made at a substantially 10 degree angle to the normal thread axis.

5. The thread screw joint of claim 4, wherein, along a straight section of the supporting face, the internal and external mating elements have different thread radii.

\* \* \* \* \*